United States Patent Office 2,837,556
Patented June 3, 1958

2,837,556

PROPIONITRILES AND METHOD OF PREPARING SAME

John A. Brockman, Jr., Woodcliff Lake, N. J., and Paul F. Fabio, Pearl River, N. Y., assignors to American Cyanamid Company, New York, N. Y., a corporation of Maine No Drawing. Application October 11, 1955
Serial No. 539,946

10 Claims. (Cl. 260—465)

This invention relates to the preparation of new organic compounds. More particularly, it relates to the novel compound 2,3-dihydroxypropionitrile and derivatives thereof and a method of preparing the same.

The natural amino acid serine has been produced synthetically by application of the Strecker cyanhydrin procedure to glycolaldehyde or more conveniently to ethoxyacetaldehyde. When using these intermediates, the processes involve a number of steps with the consequent lower yields.

We have now found that 2,3-dihydroxypropionitrile can can be easily converted into serine. This intermediate, therefore, is very useful in a process of preparing serine at a much lower cost per unit than heretofore.

The starting material in the present process is acrylonitrile, which is relatively cheap because of its widespread use in making synthetic fibers, etc. The acrylonitrile is oxidized to the corresponding glycol, 2,3-dihydroxypropionitrile, by the use of suitable oxidizing agents. Care should be used in the selection of oxidizing agents, since those such as hydrogen peroxide or chromium trioxide form insoluble polymers.

After diligent examination of numerous oxidizing agents, we have found that good yields of a pure product can be obtained by the use of a soluble salt of permanganic acid, such as potassium permanganate, sodium permanganate, barium permanganate, etc. While the potassium permanganate can be used in practically any form, good results have been obtained by using the powdered form.

A preferred method of carrying out the present process is to suspend the acrylonitrile in water or an inert, aqueous-organic solvent and add portionwise the powdered soluble permanganate salt at such a rate as to maintain a temperature of 0 to 40° C., preferably 0 to 20° C. During the addition of the permanganate, a simultaneous addition of the calculated amount of a mineral acid, such as sulfuric acid, is made to maintain the pH at 3 to 5. In general, the pH can vary from 1.0 to 9. After the addition of permanganate and acid is complete, alcohol, such as ethanol is added in such an amount as to make the solvent up to about 50% alcohol. On filtration, the byproducts, which in the case of sulfuric acid and potassium permanganate are potassium sulfate and manganese dioxide, are removed. Removal of the solvent under reduced pressure leaves the product as a residual oil. In the purification of the 2,3-dihydroxypropionitrile, it is desirable that the carboxylic acid acyl derivatives having from 1 to 7 carbon atoms, such as the benzoyl or acetyl, be prepared as shown in the examples hereinafter. Following purification, the acyl groups can be removed by hydrolysis or transesterification. It is not necessary to purify the 2,3-dihydroxypropionitrile, since it can be used in solution for the preparation of serine, as described in our copending application Serial No. 539,945, filed October 11, 1955.

The following examples illustrate the process of the present invention in greater detail.

Example 1

211.0 g. (1.34 moles) of finely ground potassium permanganate was added over a period of 2½ hours to a mixture of 500 ml. of water and 106 g. (2.0 moles) of acrylonitrile in a 4-liter, stainless steel beaker, with good stirring and cooling with an ice-salt bath. The temperature of the reaction mixture was kept between 3°–7° C. and the pH was kept close to neutral by adding 37 ml. of concentrated sulfuric acid (diluted) (0.67 mole) during the permanganate addition. Diatomaceous earth was then added and the mixture was filtered through a Buchner funnel padded with diatomaceous earth. The filtrate was evaporated down to a paste which was extracted with 300 ml. of anhydrous ethanol and filtered. The solvent in the filtrate was stripped at the water pump, leaving the product, 2,3-dihydroxypropionitrile, as an oil weighing 65.8 g.

Example 2

In a 2-liter flask 51.9 g. (0.596 mole) of crude 2,3-dihydroxypropionitrile (prepared in Example 1) was refluxed for 2 hours with 600 ml. of dry pyridine and 284 ml. of acetic anhydride. The mixture was then cooled and poured over ice, diluted with 1.5 liters of cold water and extracted with 1 liter of ether. The ether extract was washed twice with water, once with 500 ml. of 3 N hydrochloric acid and finally with water and then dried over anhydrous sodium sulfate. The solids were filtered off and the ether stripped at atmospheric pressure and finally under reduced pressure, leaving 2,3-diacetoxypropionitrile, a residual oil (27.6 g.), which was distilled at 0.03–0.04 mm. to give the following fractions:

|   | Temp., degrees | Wt., g. | $n_D^{20}$ |
|---|---|---|---|
| 1 | 70–74 | 5.74 | 1.4290 |
| 2 | 74–82 | 8.06 | 1.4292 |
| 3 | 82–84 | 6.75 | 1.4292 |
| 4 | 84 | 3.21 | 1.4302 |
| 5 | 84–113 | 0.97 | 1.4398 |

The cuts 1–4 weighed 23.76 g. (23.2% yield) and were combined and redistilled at 0.02–0.04 mm. The following fractions were collected:

|   | Temp., degrees | Wt., g. | $n_D^{20}$ |
|---|---|---|---|
| 1 | 62–69 | 3.79 | 1.4290 |
| 2 | 62–68 | 4.11 | 1.4290 |
| 3 | 68 | 5.59 | 1.4290 |
| 4 | 68 | 4.59 | 1.4291 |
| 5 | 68–76 | 4.81 | 1.4297 |

Example 3

Approximately 1 g. of cut 2 of Example 4 was dissolved in 3 ml. of dry pyridine and 2.95 ml. of benzoyl chloride was added with stirring. The mixture was then heated on the steam bath for 5 minutes. After cooling, the mixture was treated with 10 ml. of water and 4 ml. of 6 N hydrochloric acid. The solid was separated by centrifuging and washed with 10 ml. of 1 N potassium bicarbonate and then with 10 ml. of water. The solid was then spun as dry as possible in the centrifuge and crystallized from ethanol. The product weighed 2.57 g. (75.8% yield), melting point 92–92.5° C. An analytical sample of 2,3-dibenzoxypropionitrile was obtained after two recrystallizations from ethanol.

Example 4

In a 4-liter Erlenmeyer flask, 1642 ml. (0.264 mole) of barium hydroxide (0.322 N), 43.1 g. (0.252 mole) of 2,3-diacetoxypropionitrile and 500 ml. of alcohol were combined and with stirring kept at 4° C. for 63 hours.

To the mixture was then added 101.7 ml. of 5.20 N sulfuric acid (0.264 mole), and the resulting mixture was filtered through a Buchner funnel. The filtrate was evaporated at the water pump, the residual oil taken up with anhydrous ethanol and filtered. The solvent was stripped from the filtrate, and the residual oil distilled under reduced pressure to give the following cuts:

| | Temp., degrees | Press., mm | Wt., g. | $n_D^{20}$ |
|---|---|---|---|---|
| 1 | 102-104 | 0.08-0.09 | 2.01 | 1.4523 |
| 2 | 104-106 | 0.09-0.13 | 1.74 | 1.4533 |
| 3 | 106-130 | 0.13-0.50 | 1.52 | 1.4552 |

Total weight of 2,3-dihydroxypropionitrile was 5.27 g. (24% yield).

Example 5

To 68.5 g. (0.40 mole) of 2,3-acetoxylpropionitrile, was added 200 ml. of absolute methanol and 1 ml. of boron trifluoride ether complex (47% tech.) and the mixture was slowly distilled through an efficient fractionating column (25 x 500 mm. packed with Podbielniak heligrids) to remove the methanol-methyl acetate azeotrope (53 to 54°). After about 4 to 5 hours about 60% of the theoretical amount had been collected and the rate of formation appeared to have decreased, so an additional 1 ml. of boron trifluoride ether complex was added and the column was put on total reflux overnight. The remaining azeotrope was removed the following morning. Total distillation time was about 22 hours. The methanol was removed by distillation on the water pump and the residue was distilled on the oil pump to give the following cuts.

| | Temp., degrees | Press., mm. | Wt., g. | $n_D^{20}$ |
|---|---|---|---|---|
| 1 | 108-121 | 0.19-0.45 | 2.91 | 1.4498 |
| 2 | 121-122 | 0.45-0.48 | 4.43 | 1.4522 |
| 3 | 122 | 0.48-0.46 | 11.17 | 1.4534 |
| 4 | 122-124 | 0.46-0.50 | 3.63 | 1.4540 |

We claim:

1. A method of preparing a member of the group consisting of 2,3-dihydroxypropionitrile and carboxylic acid acyl derivatives, which comprises reacting acrylonitrile with a soluble permanganate salt in the presence of a mineral acid in a substantially aqueous solution and recovering the glycol and following acylation, the carboxylic acid acyl derivative therefrom.

2. A method of preparing 2,3-dihydroxypropionitrile which comprises reacting acrylonitrile with potassium permanganate in the presence of a mineral acid and a substantially aqueous solution.

3. A method of preparing 2,3-dihydroxypropionitrile which comprises reacting acrylonitrile with potassium permanganate in the presence of sulfuric acid and a substantially aqueous solution.

4. A method of preparing 2,3-dihydroxypropionitrile which comprises reacting acrylonitrile with potassium permanganate in an aqueous-sulfuric acid medium having a pH of from 3 to 5.

5. A method of preparing 2,3-dihydroxypropionitrile which comprises reacting acrylonitrile with potassium permanganate in an aqueous-sulfuric acid medium having a pH of from 3 to 5 and a temperature of from 0° to 20° C.

6. A compound selected from the group consisting of 2,3-dihydroxypropionitrile and carboxylic acid acyl derivatives thereof having from 1 to 7 carbon atoms.

7. 2,3-dihydroxypropionitrile.

8. 2,3-diacetoxypropionitrile.

9. 2,3-dibenzoxypropionitrile.

10. A 2,3-di(carboxylic acid acyl)oxypropionitrile wherein the acyl group contains not more than 7 carbon atoms.

References Cited in the file of this patent
UNITED STATES PATENTS

| 2,231,360 | D'Ianni | Feb. 11, 1941 |
| 2,379,297 | Harmon et al. | June 26, 1945 |
| 2,438,090 | Clifford et al. | Mar. 16, 1948 |
| 2,500,599 | Bergsteinsson et al. | May 14, 1950 |
| 2,735,864 | Smith et al. | Feb. 21, 1956 |

OTHER REFERENCES

Frankland et al., Jour. Chem. Soc. (London), vol. 69, page 269 (1901).

Hurd et al., Jour. Am. Chem. Soc., vol. 61, page 1159 (1939).

Rambaud et al., Compt. rendus., vol. 238, pp. 1231-2 (1954).

Justoni, Gazz. Chim. et al., vol. 69, p. 382 (1939).